United States Patent
Gendler et al.

(10) Patent No.: US 11,275,663 B2
(45) Date of Patent: Mar. 15, 2022

(54) FAST DYNAMIC CAPACITANCE, FREQUENCY, AND/OR VOLTAGE THROTTLING APPARATUS AND METHOD

(71) Applicant: Intel Corporation, Santa Clara, CA (US)

(72) Inventors: Alexander Gendler, Kiriat Motzkin (IL); Nimrod Angel, Haifa (IL); Ameya Ambardekar, Hillsboro, OR (US); Sapumal Wijeratne, Portland, OR (US); Vikas Vij, Portland, OR (US); Tod Schiff, Portland, OR (US); Alexander Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/896,070

(22) Filed: Jun. 8, 2020

(65) Prior Publication Data
US 2021/0382805 A1    Dec. 9, 2021

(51) Int. Cl.
*G06F 1/3296* (2019.01)
*G06F 11/30* (2006.01)
*G06F 11/07* (2006.01)
*G06F 9/30* (2018.01)
*G06F 9/4401* (2018.01)

(52) U.S. Cl.
CPC ........ *G06F 11/3062* (2013.01); *G06F 1/3296* (2013.01); *G06F 9/30101* (2013.01); *G06F 9/4403* (2013.01); *G06F 11/076* (2013.01)

(58) Field of Classification Search
CPC ............... G06F 11/3062; G06F 1/3296; G06F 9/30101; G06F 9/4403; G06F 11/076
See application file for complete search history.

(56) References Cited

U.S. PATENT DOCUMENTS

| | | | |
|---|---|---|---|
| 5,423,045 A * | 6/1995 | Kannan | G06F 1/30 365/229 |
| 10,873,949 B1 * | 12/2020 | Li | H04W 72/048 |
| 2002/0065618 A1 * | 5/2002 | Oh | G06F 1/3287 702/57 |
| 2002/0093311 A1 * | 7/2002 | Stryker | G06F 1/206 320/135 |

(Continued)

*Primary Examiner* — Gary Collins
(74) *Attorney, Agent, or Firm* — Schwabe, Williamson & Wyatt, P.C.

(57) ABSTRACT

A dedicated pin of a processor or system-on-chip (SoC) is used to indicate whether power level (e.g., charge, voltage, and/or current) of a battery falls below a threshold. The threshold can be predetermined or programmable. The battery is used to provide power to the processor and/or SoC. Upon determining that the power level of the battery falls below the threshold, the processor by-passes the conventional process of entering low performance or power mode, and directly throttles voltage and/or operating frequency of the processor. This allows the processor to continue to operate at low battery power. The fast transition (e.g., approximately 10 μS) from an active state to a low performance or power mode, in accordance with a logic level of the voltage on the dedicated pin, reduces decoupling capacitor design requirements, and makes it possible for the processor to adapt higher package power control settings (e.g., PL4).

20 Claims, 6 Drawing Sheets

(56) References Cited

U.S. PATENT DOCUMENTS

| | | | |
|---|---|---|---|
| 2002/0108070 A1* | 8/2002 | Oh | G06F 1/3243 713/600 |
| 2012/0254633 A1* | 10/2012 | Vilhauer | G06F 1/3206 713/300 |
| 2013/0138984 A1* | 5/2013 | Wortham | G06F 1/3212 713/320 |
| 2013/0227327 A1* | 8/2013 | Chun | G06F 1/324 713/340 |
| 2014/0095905 A1* | 4/2014 | Sistla | G06F 1/329 713/320 |
| 2014/0173305 A1* | 6/2014 | Uan-Zo-Li | G06F 1/3212 713/320 |
| 2016/0054776 A1* | 2/2016 | Lu | G06F 1/3206 713/322 |
| 2016/0070330 A1* | 3/2016 | Yang | H02J 7/0047 713/320 |
| 2016/0142054 A1* | 5/2016 | Mojumder | H03K 19/018507 327/333 |
| 2019/0041969 A1* | 2/2019 | Nge | G06F 1/329 |
| 2019/0369701 A1* | 12/2019 | Lien | G06F 1/3293 |

* cited by examiner

| Register | Bits<br>32 bits | Field |
|---|---|---|
| FORCE_THROTTLE_CONTROL | [0] | Enable |
| | [3:1] | Throttle Level |
| | [31:4] | Reserved |

| Throttle Level | Frequency | Voltage | Current |
|---|---|---|---|
| 1 | f1 | v1 | i1 |
| 2 | f2 | v2 | i2 |
| ⋮ | | | |
| 16 | f16 | v16 | i16 |

FAST DYNAMIC CAPACITANCE, FREQUENCY, AND/OR VOLTAGE THROTTLING APPARATUS AND METHOD

BACKGROUND

Maximum current output from a battery limits the maximum high frequency operation of a processor. For example, for a multi-core processor, the turbo mode frequency is limited by maximum high frequency. When a voltage level or current delivery from a battery to a processor, or system comprising the processor, falls below a threshold, the processor or the system in coordination with an operating system may decide to go into low power mode so the processor or system can continue to operate but at reduced performance level. However, such transition to low power mode takes time. For example, a processor may take 300 µS or more to lower an operating frequency to a minimal frequency. Such, delay may negatively impact user experience. Further, the response time to enter low power mode may determine a size of decoupling capacitor(s) on power supply rail(s) of a platform. The decoupling capacitor(s) maintain voltage on the power supply rail(s) when the battery can no longer provide the power demanded. A higher response time to enter low power mode means that the decoupling capacitor(s) should be large in size to maintain voltage and allow the system time to enter the low power mode. Large decoupling capacitor(s) may increase bill-of-material (BoM) of the system.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Various embodiments describe an apparatus and method for fast dynamic capacitance, frequency, and/or voltage throttling. In some embodiments, a dedicated pin of a processor or system-on-chip (SoC) is used to indicate whether power level (e.g., charge, voltage, and/or current) of a battery falls below a threshold. The threshold can be predetermined or programmable. The battery is used to provide power to the processor and/or SoC. Upon determining that the power level of the battery falls below the threshold, the processor by-passes the conventional process of entering low performance or power mode, and directly throttles voltage and/or operating frequency of the processor. This allows the processor to continue to operate at low battery power. The fast transition (e.g., approximately 10 µS) from an active state to a low performance or power mode, in accordance with a logic level of the voltage on the dedicated pin, reduces decoupling capacitor design requirements, and makes it possible for the processor to adapt higher package power control settings (e.g., PL4). Other examples of package power control settings are PL1, PL2, PL4, and Tau. In some embodiments, a register is provided to enable or disable the features for fast throttling of voltage and/or operating frequency.

Here, power limit 1 (PL1) refers to a threshold for average power that should not exceed higher than thermal solution cooling limits. PL1 is generally set to equal TDP power. PL1 should not be set higher than thermal solution cooling limits.

Here, power limit 2 (PL2) refers to a power threshold that if exceeded, the PL2 rapid power limiting algorithms will attempt to limit the spike above PL2.

Here, power limit 3 (PL3) refers to a power threshold that if exceeded, PL3 rapid power limiting algorithms will attempt to limit the duty cycle of spikes above PL3 by reactively limiting frequency.

Here, power Limit 4 (PL4) refers to a power limit that will not be exceeded. PL4 power limiting algorithms will pre-emptively limit frequency to prevent spikes above PL4.

Here, Turbo Time Parameter (Tau) refers to an averaging constant used for PL1 exponential weighted moving average (EWMA) power calculation.

There are many technical effects of various embodiments. For example, various embodiments provide a mechanism for fast or quick response to a platform power event (e.g., battery level falling below a threshold). The response takes the form of throttling voltage and/or operating frequency of the processor. The mechanism allows for lowering the minimum current specification (Icc Min) for the processor or SoC. For example, Icc Min can reduce by 2× compared to the original Icc Min. The mechanism also allows adaption of higher package control settings such as PL3 and PL4, which are otherwise typically disabled. The fast response that results in throttling voltage and/or operating frequency of the processor allows to reduce the size of the decoupling capacitor, thus reducing the cost of the platform. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" here generally refers to any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top." "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Figure 1A:
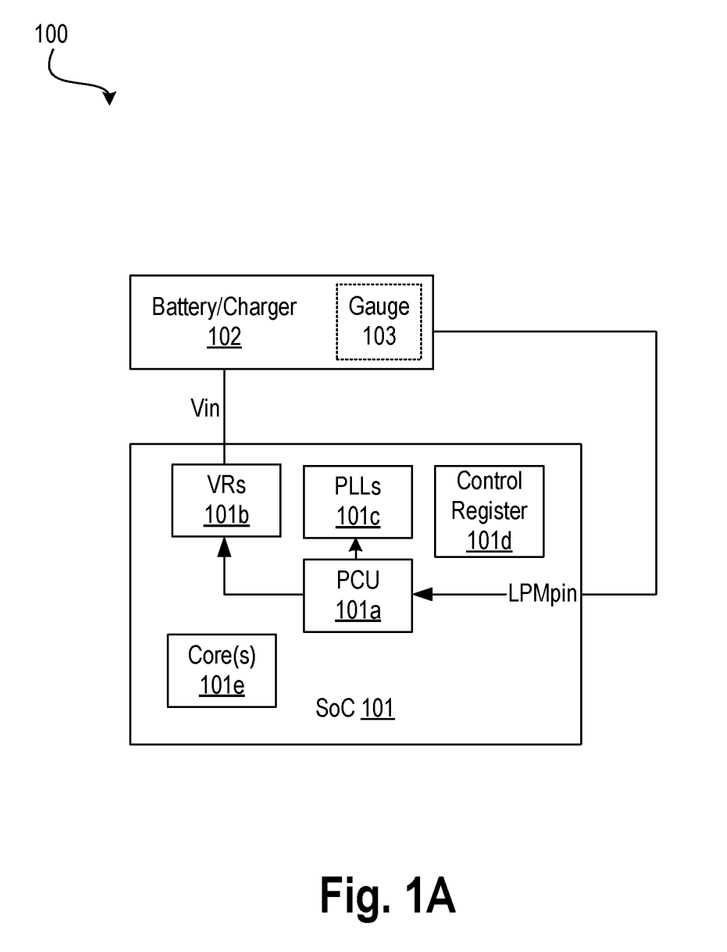
FIG. 1A illustrates an apparatus for fast low power mode by dynamic capacitance, frequency, and/or voltage throttling, in accordance with some embodiments.

FIG. 1A illustrates apparatus 100 for fast low power mode by dynamic capacitance, frequency, and/or voltage throttling, in accordance with some embodiments. Apparatus 100 is a simplified representation of a platform having a processor or system-on-chip (SoC) 101 powered by a supply source 102 (e.g., a battery or charger 102). In various embodiments, SoC 101 comprises a dedicated pin LPMpin (low power mode pin) that provides information about the condition of battery 102. In some embodiments, LPMpin is the PROCHOT #pin of a processor.

A fuel gauge 103 or any suitable logic or chip monitors the voltage and/or current (or charge) supply from battery 102 to processor 101. For example, a comparator in fuel gauge 103 compares the charge level of battery 102 with a threshold, and provides an output which is received by LPMpin. The threshold can be programmable by software (e.g., firmware) or hardware (e.g., fuse, register, etc.). In some embodiments, the threshold is set to 20% of the battery capacity. However, any other threshold value can be used. Upon reaching the threshold level of battery 102, fuel gauge 103 or any suitable logic or chip asserts the LPMpin to initiate fast throttling flow.

SoC 101 receives the signal on LPMpin and routes it to power control unit (PCU) 101a which manages the power of processor 101. PCU 101a manages the power states of processor 101, voltage levels from VRs 101b, clock frequency from PLLs 101c, and other aspects of processor cores 101e as described with reference to FIG. 5. Referring back to FIG. 1A, depending on whether fast throttling is enabled, PCU 101a performs a low power mode flow. If fast throttling or fast low power mode is disabled, PCU 101a performs traditional dynamic voltage and frequency (DVFS) flow, which takes more time to enter low power state compared to fast throttling flow of various embodiments.

Here, throttling refers to adjusting one or more performance parameters to reduce power consumption of processor 101. These one or more performance parameters include voltage, frequency, and/or capacitance, etc. For example, throttling processor 101 may involve lowering the input supply Vin to VRs 101b, changing a divider ratio of PLL 101c to reduce clock frequency, clock squashing for quick reduction in a clock frequency, power gating, reducing capacitance on high activity signal routes, etc.

When LPMpin is asserted and control register 101d indicates that fast throttling is enabled, then PCU 101a (or any other suitable logic) bypasses traditional finite state machine(s) to enter low power mode (e.g., C states, S0iX states, etc.) and directly throttles the one or more performance parameters. As such, fast throttling is achieved which lowers the power of processor 101 to accommodate low battery charge level. Fast throttle of the one or more cores 101e comprises lower frequency, voltage, and/or capacitance of the one or more cores 101e.

Figure 1B:
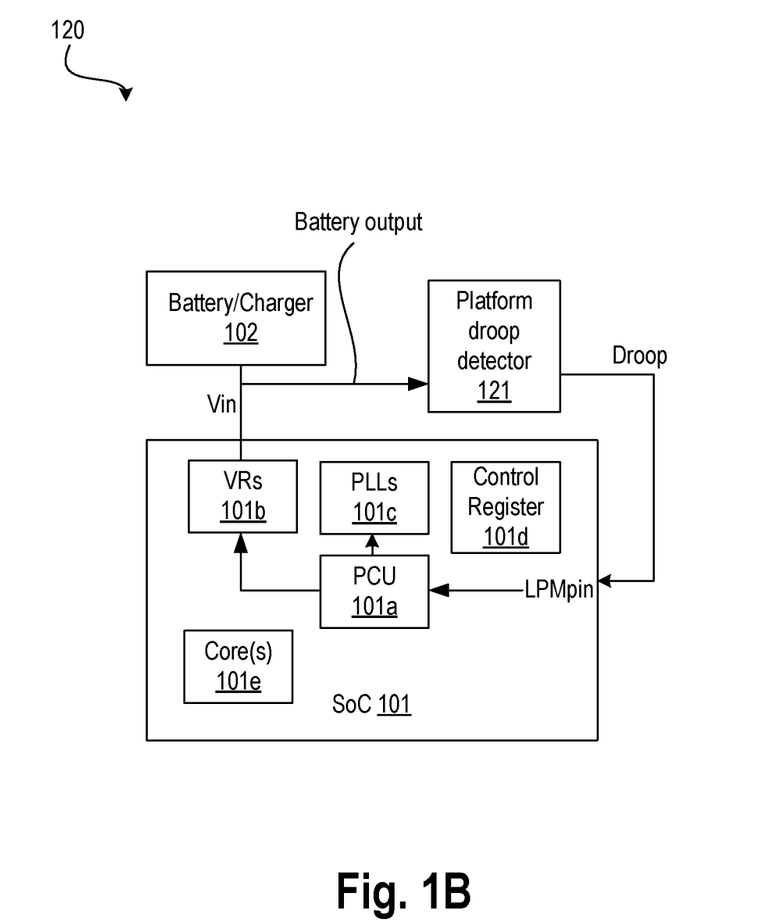
FIG. 1B illustrates an apparatus with droop detector for fast low power mode by dynamic capacitance, frequency, and/or voltage throttling, in accordance with some embodiments.

FIG. 1B illustrates apparatus 120 with droop detector for fast low power mode by dynamic capacitance, frequency, and/or voltage throttling, in accordance with some embodiments. In some embodiments, a platform level droop detector 121 is provided that monitors the battery output (e.g., Vin) and compares it with a threshold. The output of platform level droop detector 121 is a Droop signal. The Droop signal is a single bit signal indicating whether there is a droop on Vin. The threshold for platform level droop detector 121 can be programmed by software/firmware or hardware (e.g., fuses). In some embodiments, the outputs of fuel gauge 103 and droop detector 121 are OR-ed to generate the final signal that is fed into the LPMpin. In such an embodiment, redundancy circuitry provides the extra confidence should one of the fuel gauge 103 or droop detector 121 fail to operate properly. Platform level droop detector 121 may be used for cases where battery/charger 102 does not have a fuel gauge. Any suitable circuitry for detecting voltage droop can be used to implement platform level droop detector 121.

Figure 2A:
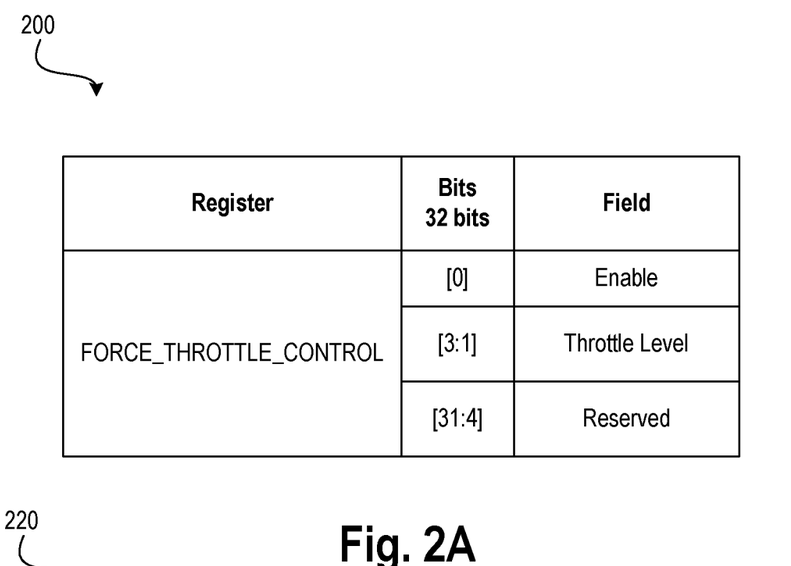
FIG. 2A illustrates a control register for enabling the fast low power mode, in accordance with some embodiments.

FIG. 2A illustrates control register 200 (e.g., 101d) for enabling the fast low power mode, in accordance with some embodiments. Control register 200 includes register name (e.g., FORCE_THOTTLE_CONTROL), number of bits (e.g., 32 bits), and fields for the bits (e.g., enable, throttle level, etc.). In this example, bit [0] (a single bit) of FORCE_THOTTLE_CONTROL is sued to enable or disable the fast throttling scheme. When enabled, PCU 101a bypasses the traditional low power mode scheme flow and quickly throttles processor 101. When disabled, PCU 101a follows the traditional low power mode scheme. In some embodiments, throttle level is described by four bits [3:1] providing 16 different settings. The number of bits for different fields are shown as an example. Any number of bits may be used. In this example, bits [31:4] are reserved bits.

Figure 2B:
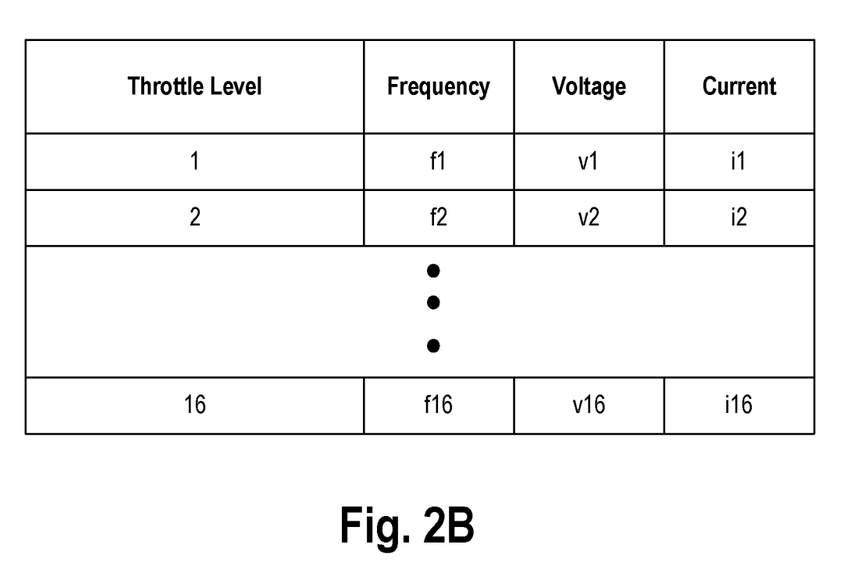
FIG. 2B illustrates a lookup table for throttle states, in accordance with some embodiments.

FIG. 2B illustrates lookup table (LUT) 220 for throttle states, in accordance with some embodiments. LUT 220 illustrates 16 different throttling levels for the four bits of control register 200. PCU 101a may use one or more of the parameters (frequency, voltage, current) of LUT 220 to throttle processor 101. In one example, when Throttle Level field of control register 200 is 0010 throttle level, PCU 101a selects frequency f2, voltage v2, and current i2 as targets for throttling processor 101. Other throttle levels can be achieved by different Throttle Level fields of control register 200. Here, frequency is the operating frequency of core(s) 101e, voltage is the power supply voltage level provided to cores(s), and current is the current supply from the voltage regulators 101b. The frequency may also be an average frequency of processor 101 (e.g., average frequency of call operating cores 101e), voltage is the average power supply voltage level of processor 101 (e.g., average voltage supply level of operating cores 101e), and current is the average current supply from the voltage regulators 101b. While LUT 220 shows 16 throttle levels, any number of throttle levels may be identified for fast throttling.

Figure 3:
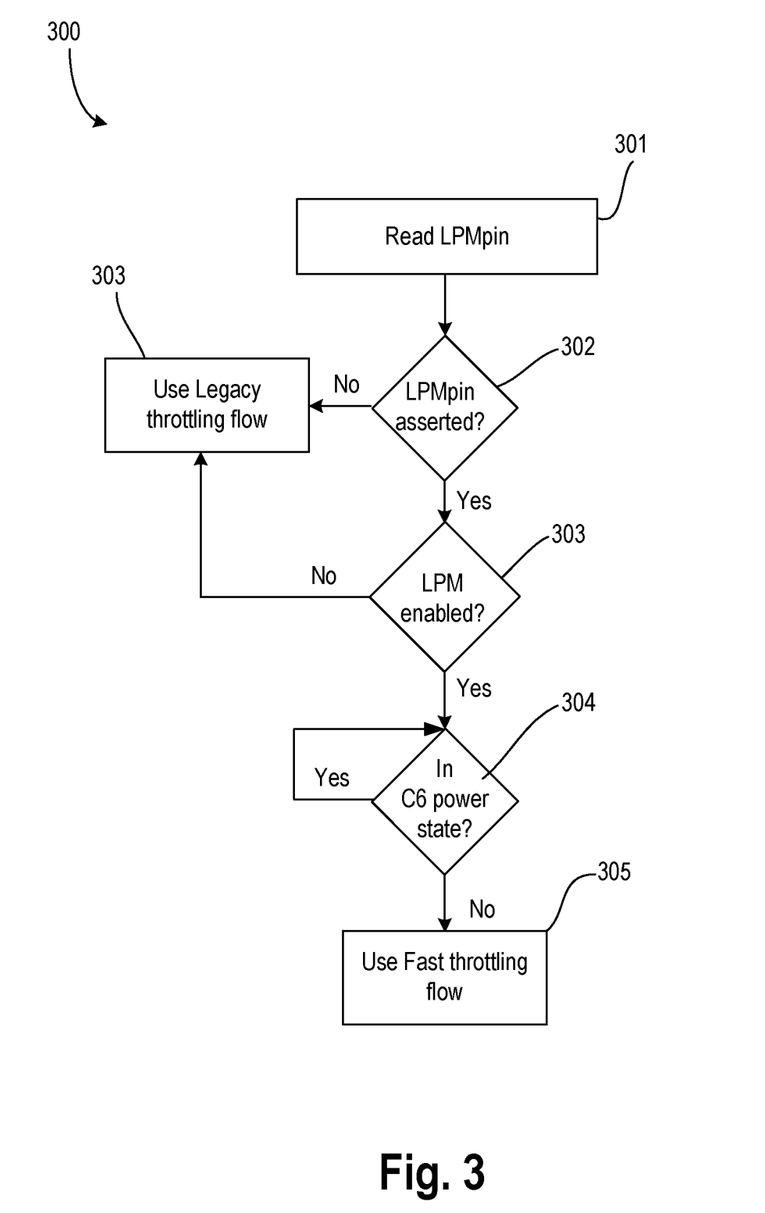
FIG. 3 illustrates a flowchart for fast low power mode, in accordance with some embodiments.

FIG. 3 illustrates flowchart 300 for fast low power mode, in accordance with some embodiments. While various blocks of flowchart 300 are illustrated in a particular order, the order can be modified. For example, some blocks can be performed in parallel.

At block 301, PCU 101a or any suitable logic reads the logic level of LPMpin. For example, PCU 101a compares the logic level on the signal on the LPMpin with a threshold to determine the logic level of the LPMpin. At block 302, PCU 101a determines whether the LPMpin is asserted. A person skilled in the art would appreciate that determining a logic level of a pin is determining a logic level of a signal on that pin. If LPMpin is asserted, then at block 303, PCU 101a checks the control register 200 to determine the logic value of field [0] to ascertain whether fast throttling is enabled. If LPMpin is not asserted, then PCU 101a uses legacy or traditional throttling flow (e.g., legacy dynamic voltage and frequency scaling flow). If LPM is enabled, the process proceeds to block 304. At block 304, PCU 101a determines the existing power state of processor 101.

Existing power state may determine what throttling level to select from LUT 220. In one example, when PCU 101a determines that processor 101 is in C6 power state (as defined by the Advanced Configuration and Power Interface (ACPI) specification version 6.3 of January 2019), then processor 101 is already in a very low power mode and further throttling may not be desirable. In that case, PCU 101a waits for a different power mode state or end of C6 power state flow before fast throttle process begins. At block 305, PCU 101a realizes the fast throttling flow by directly reducing frequency, voltage, and/or current (or capacitance) to lower the power consumption of processor 101.

In some embodiments, fast LPM flow (or fast throttle flow) is given higher priority over legacy DVFS (dynamic voltage and frequency scaling). In some embodiments, if core 101e is in the DVFS process, PCU 101a will allow core 101e to complete DVFS before moving on to the fast throttling flow. If the core(s) 101e of processor 101 are performing the fast throttle flow, then PCU 101a bypasses or postpones any command to perform DVFS till after the fast throttling is complete.

In some embodiments, when processor 101 exits the fast throttling flow (e.g., when LPMpin is de-asserted), PCU 101a may review the current loading condition of processor 101 and enter a power state accordingly. For example, after exiting fast throttling flow, if PCU 101a determines that processor 101 is idle (e.g., low loading condition) and is not executing instructions, it may enter C1E state. C 1E is a hardware feature that allows processor 101 to enter idle state (×12 mult) while processor 101 is not loaded. In some embodiments, when processor is in C1E state and LPMpin is asserted, PCU 101a transitions to the fast throttling flow and exits the C1E state. PCU 101a may return on C1E state after fast throttling flow ends and the loading conditions for C1E state are met. During system power state (e.g., S1-S4 states), processor core 101e may not respond to the fast LPM triggered by the LPMpin. In that case, the system may have to wait for the processor core 101e to enter an active state (e.g., C0 state) to proceed with the fast LPM triggered by the LPMpin.

In some embodiments, when TT1 (thermal throttling flow) is enabled, fast LPM is enabled after acknowledgment is received by PCU 101a that Cl power state has exited. In some embodiments, fast LPM mode is debugged via design-for-test (DFT) circuits and/or telemetry information. In some embodiments, PCU 101a (or any other suitable logic) may include a counter to count up using a reference clock (e.g., reference clock to a phase locked loop) during the time processor 101 in in fast throttling mode. The output of the counter is visible by an operating system, a scan chain, a debug pin etc. In some embodiments, an additional counter tracks the number of transitions into fast LPM. For example, this additional counter counts every time processor 101 enters and/or exits fast LPM. The output of this additional counter may be visible by an operating system, a scan chain, a debug pin etc.

Figure 4:
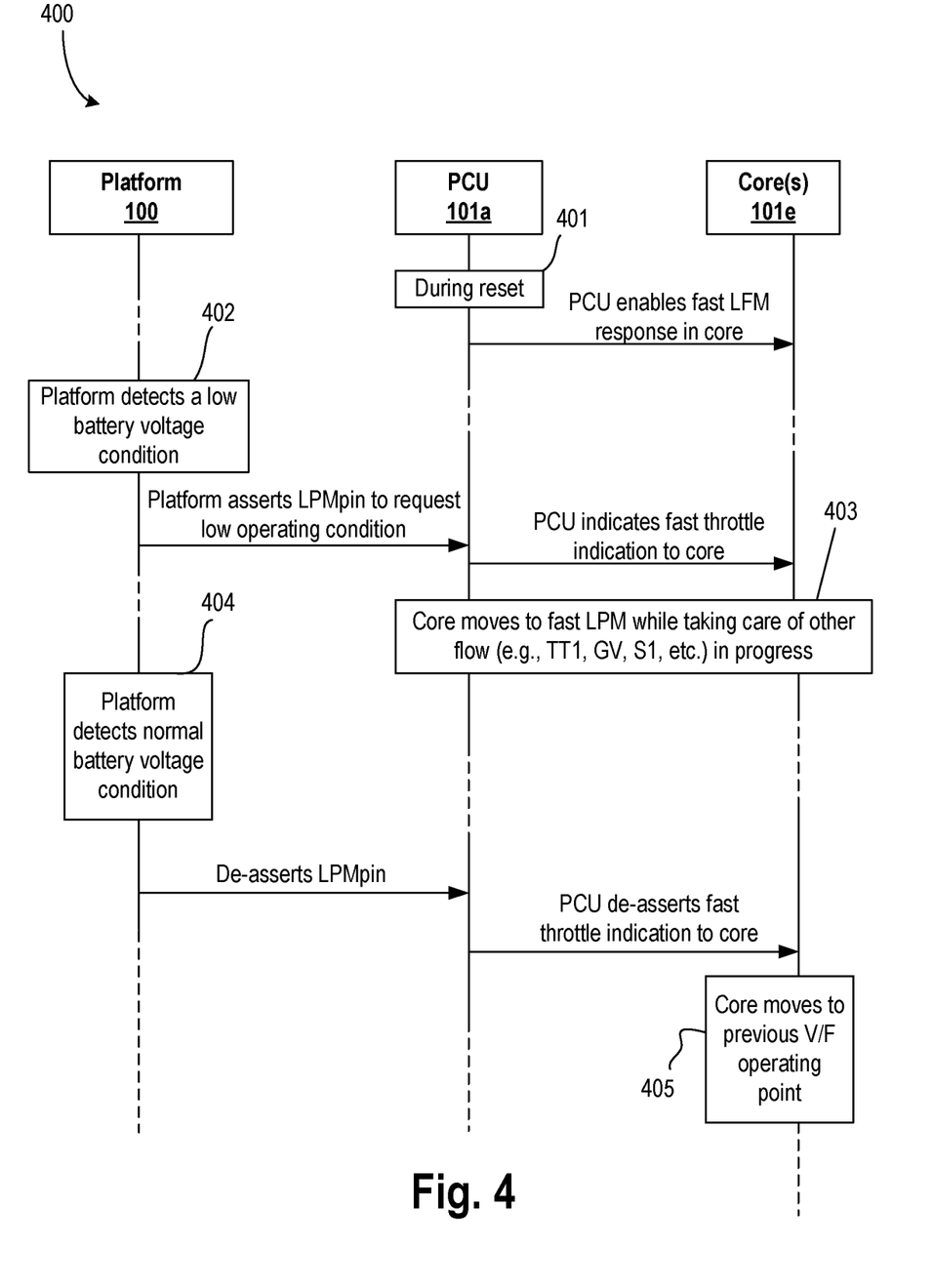
FIG. 4 illustrates a flowchart at platform-level for fast low power mode, in accordance with some embodiments.

FIG. 4 illustrates flowchart 400 at platform-level for fast low power mode, in accordance with some embodiments. Flowchart 400 illustrates a handshake process between platform 100, PCU 101a, and Core(s) 101e to enable and implement fast throttling scheme. In various embodiments during or after processor reset flow 401, PCU 101a enables fast LPM response for core(s) 101e by setting bit [0] of FORCE_THROTTLE_CONTROL register. As such, core(s) 101e are enabled to implement fast low power mode.

At block 402, platform detects low battery voltage condition. For example, fuel gauge 103 or any suitable logic may monitor charge of battery 102 and determine that the charge level of battery 102 has fallen below a threshold. In that case, platform 100 asserts LPMpin to request PCU 101a to begin the fast throttling flow. Upon detecting that LPMpin is asserted, PCU 101a send a fast throttling indication to core(s) 101e. This causes core(s) 101e to give fast throttling flow priority over other power mode operations such as TT1, GV (e.g., local clock throttling), system power state S1, etc.) as indicated by block 403. Here, GV refers to frequency and/or voltage throttling.

PCU 101a then manages the handshakes between any ongoing power state flows with the fast throttling flow, and processor 101 proceeds with the fast throttling flow. At block 404, platform indicates that battery charge has improved and is above the threshold. Platform then de-asserts LPMpin to indicate to PCU 101a that it may end the fast throttling flow. PCU 101a informs core(s) 101e that fast throttling flow is no longer needed. As a result, core(s) 101e return to normal DVFS flow at block 405.

Figure 5:
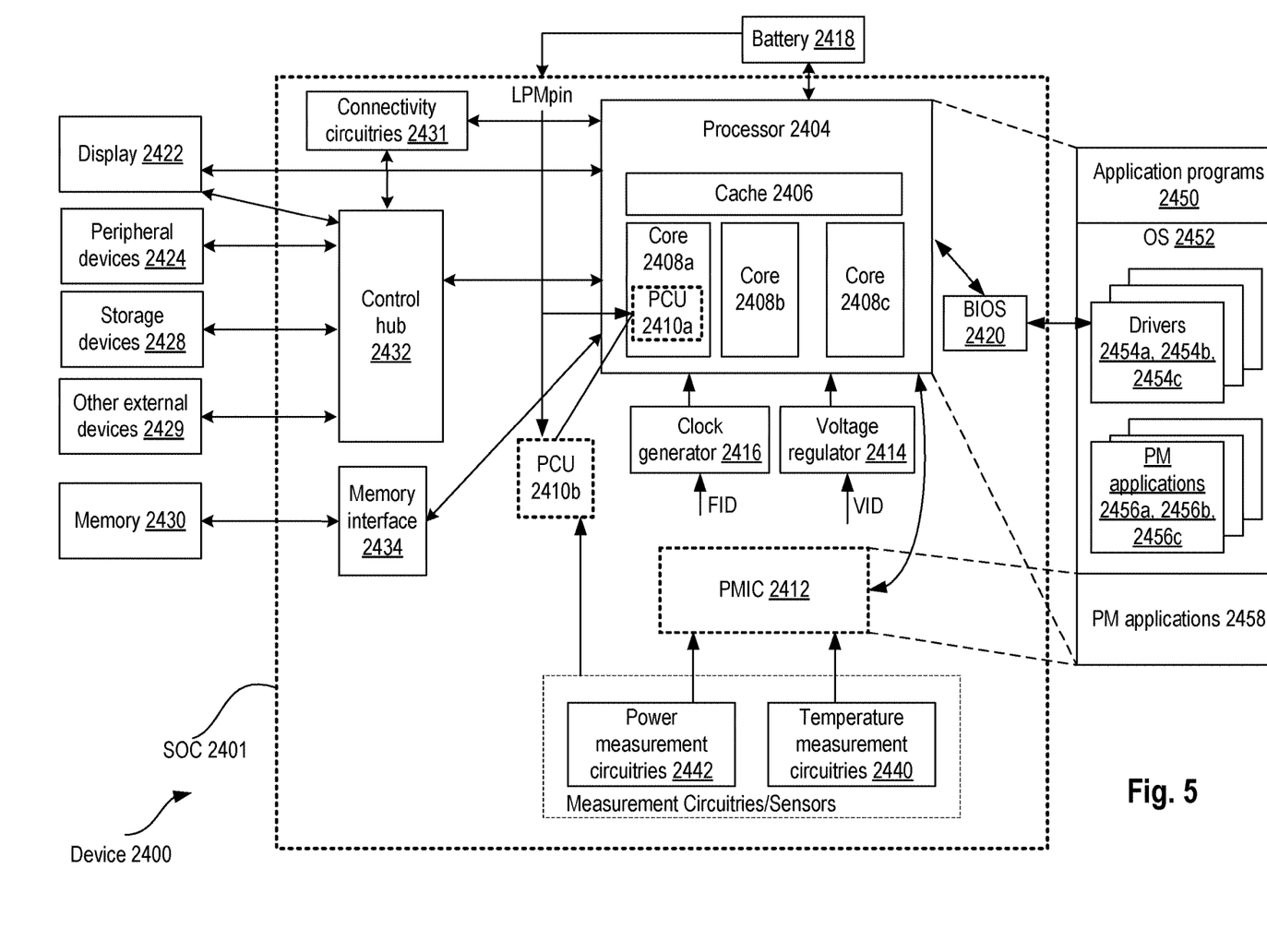
FIG. 5 illustrates a smart device or a computer system or a SoC (System-on-Chip) having apparatus for fast low power mode by dynamic capacitance, frequency, and/or voltage throttling, in accordance with various embodiments.

FIG. 5 illustrates a smart device or a computer system or a SoC (System-on-Chip) having apparatus for fast low power mode by dynamic capacitance, frequency, and/or voltage throttling, in accordance with various embodiments. It is pointed out that those elements of FIG. 5 having the same reference numbers (or names) as the elements of any other figure can operate or function in any manner similar to that described, but are not limited to such.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 5, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 5, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400. In some embodiments, PCU 2410 manages the fast low power mode by dynamic capacitance, frequency, and/or voltage throttling.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

In various embodiments, a dedicated pin LPMpin of SoC 2401 is used to indicate whether power level (e.g., charge, voltage, and/or current) of battery 2418 falls below a threshold. The threshold can be predetermined or programmable. Battery 2418 is used to provide power to the processor and/or SoC 2401. Upon determining that the power level of battery 2418 falls below the threshold, PCU 2410a or 2410b by-passes the conventional process of entering low performance or power mode, and directly throttles voltage and/or operating frequency of processor 2402 or SoC 2401. This allows the processor 2402 or SoC 2401 to continue to operate at low battery power. The fast transition (e.g., approximately 10 μS) from an active state (e.g., C0 state) to a low performance or power mode, in accordance with a logic level of the voltage on the dedicated pin LPMpin, reduces decoupling capacitor design requirements, and makes it possible for processor 2402 or SoC 2401 to adapt higher package power control settings (e.g., PL4).

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: A processor comprising: a pin to receive an indication about battery charge relative to a threshold; one or more processor cores; and a power control unit to process the indication from the pin and determine whether to fast throttle the one or more processor cores, wherein to fast throttle the one or more processor cores, the power control unit is to bypass a legacy dynamic voltage and frequency scaling flow and directly throttle the one or more processor cores.

Example 2: The processor of example 1 comprises a register to set a bit to enable or disable the fast throttle.

Example 3: The processor of example 2, wherein the register includes one or more fields for throttle levels.

Example 4: The processor of example 3 comprises a lookup table to store the throttle levels.

Example 5: The processor of example 2, wherein the bit for the register is set at reset.

Example 6: The processor of example 1, wherein the threshold is programmable.

Example 7: The processor of example 1, wherein to fast throttle the one or more cores comprises lower frequency, voltage, and/or capacitance of the one or more cores.

Example 8: The processor of example 1, wherein the power control unit is to postpone the fast throttle if the processor is in C6 power state.

Example 9: An apparatus comprising: a pin to receive an indication about battery charge relative to a threshold; one or more processor cores; and a power control unit to process the indication from the pin and determine whether to fast throttle the one or more processor cores, wherein the power control unit is to postpone the fast throttle if any of the one or more processor cores is in a C6 power state.

Example 10: The apparatus of example 9, wherein to fast throttle the one or more processor cores, the power control unit is to bypass legacy dynamic voltage and frequency scaling flow and directly throttle the one or more cores.

Example 11: The apparatus of example 9 comprises a register to set a bit to enable or disable the fast throttle.

Example 12: The apparatus of example 11, wherein the register includes one or more fields for throttle levels.

Example 13: The apparatus of example 14 comprises a lookup table to store the throttle levels.

Example 14: The apparatus of example 12, wherein the bit for the register is set at reset.

Example 15: The apparatus of example 9, wherein the threshold is programmable.

Example 16: The apparatus of example 9, wherein to fast throttle the one or more cores comprises lower frequency, voltage, and/or capacitance of the one or more cores.

Example 17: A system comprising: a memory; a processor coupled to the memory; a battery to power the processor; and a fuel gauge to monitor charge level of the battery with reference to a threshold, wherein an output of the fuel gauge is provided to a pin of the processor, wherein the processor comprises: one or more processor cores; and a power control unit to process an indication from the pin and determine whether to fast throttle the one or more cores based on a logic level of the pin, wherein to fast throttle the one or more processor cores, the power control unit is to bypass legacy dynamic voltage and frequency scaling flow and directly throttle the one or more processor cores.

Example 18: The system of example 17, wherein the processor comprises a register to set a bit to enable or disable the fast throttle, wherein the register includes field for throttle levels.

Example 19: The system of example 17, wherein the processor comprises a lookup table to store the throttle levels.

Example 20: The system of example 17, wherein the power control unit is to postpone the fast throttle if the processor is in C6 power state.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A processor comprising:
a pin to receive an indication about battery charge relative to a threshold;
one or more processor cores; and
a power control unit to process the indication from the pin and determine whether to fast throttle the one or more processor cores, wherein to fast throttle the one or more processor cores, the power control unit is to bypass a legacy dynamic voltage and frequency scaling flow and directly throttle the one or more processor cores, and wherein the power control unit is to postpone the fast throttle if the processor is in a first power state.

2. The processor of claim 1, further comprising a register to set a bit to enable or disable the fast throttle.

3. The processor of claim 2, wherein the register includes one or more fields for throttle levels.

4. The processor of claim 3, further comprising a lookup table to store the throttle levels.

5. The processor of claim 2, wherein the bit for the register is set at reset.

6. The processor of claim 1, wherein the threshold is programmable.

7. The processor of claim 1, wherein to fast throttle the one or more cores comprises lower frequency, voltage, and/or capacitance of the one or more cores.

8. The processor of claim 1, wherein the first power state is C6 power state.

9. An apparatus comprising:
a pin to receive an indication about battery charge relative to a threshold;
one or more processor cores; and
a power control unit to process the indication from the pin and determine whether to fast throttle the one or more processor cores, wherein the power control unit is to postpone the fast throttle if any of the one or more processor cores is in a C6 power state.

10. The apparatus of claim 9, wherein to fast throttle the one or more processor cores, the power control unit is to bypass legacy dynamic voltage and frequency scaling flow and directly throttle the one or more cores.

11. The apparatus of claim 9, further comprising a register to set a bit to enable or disable the fast throttle.

12. The apparatus of claim 11, wherein the register includes one or more fields for throttle levels.

13. The apparatus of claim 12, further comprising a lookup table to store the throttle levels.

14. The apparatus of claim 12, wherein the bit for the register is set at reset.

15. The apparatus of claim 9, wherein the threshold is programmable.

16. The apparatus of claim 9, wherein to fast throttle the one or more cores comprises lower frequency, voltage, and/or capacitance of the one or more cores.

17. A system comprising:
a memory;
a processor coupled to the memory;
a battery to power the processor; and
a fuel gauge to monitor charge level of the battery with reference to a threshold, wherein an output of the fuel gauge is provided to a pin of the processor, wherein the processor comprises:
one or more processor cores; and
a power control unit to process an indication from the pin and determine whether to fast throttle the one or more cores based on a logic level of the pin, wherein to fast throttle the one or more processor cores, the power control unit is to bypass legacy dynamic voltage and frequency scaling flow and directly throttle the one or more processor cores, and wherein the power control unit is to postpone the fast throttle if the processor is in a first power state.

18. The system of claim 17, wherein the processor comprises a register to set a bit to enable or disable the fast throttle, wherein the register includes field for throttle levels.

19. The system of claim 17, wherein the processor comprises a lookup table to store the throttle levels.

20. The system of claim 17, wherein the first power state is C6 power state.

\* \* \* \* \*